(12) United States Patent
Tanai et al.

(10) Patent No.: US 8,359,830 B2
(45) Date of Patent: Jan. 29, 2013

(54) EXHAUST PURIFICATION DEVICE OF AN INTERNAL COMBUSTION ENGINE

(75) Inventors: Yutaka Tanai, Susono (JP); Tomihisa Oda, Numazu (JP); Kazuhiro Itoh, Mishima (JP); Shunsuke Toshioka, Susono (JP); Takekazu Itoh, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 637 days.

(21) Appl. No.: 12/308,251

(22) PCT Filed: Mar. 19, 2008

(86) PCT No.: PCT/JP2008/055797
§ 371 (c)(1),
(2), (4) Date: Dec. 11, 2008

(87) PCT Pub. No.: WO2008/120649
PCT Pub. Date: Oct. 9, 2008

(65) Prior Publication Data
US 2010/0043405 A1 Feb. 25, 2010

(30) Foreign Application Priority Data
Mar. 29, 2007 (JP) .................... 2007-086481

(51) Int. Cl.
*F01N 3/00* (2006.01)
*F01N 3/10* (2006.01)
*G01M 15/00* (2006.01)

(52) U.S. Cl. ................ 60/286; 60/276; 60/295; 60/301; 73/114.71

(58) Field of Classification Search .................... 60/286, 60/276, 295, 301; 73/114.71
See application file for complete search history.

(56) References Cited

U.S. PATENT DOCUMENTS

| 6,017,503 | A | 1/2000 | Kato et al. | |
|---|---|---|---|---|
| 6,427,439 | B1 * | 8/2002 | Xu et al. | 60/286 |
| 7,546,728 | B2 * | 6/2009 | Ripper et al. | 60/286 |
| 7,954,364 | B2 * | 6/2011 | Shoda | 73/114.69 |

(Continued)

FOREIGN PATENT DOCUMENTS

| CN | 1306601 A | 8/2001 |
|---|---|---|
| DE | 102005042488 A1 * | 3/2007 |

(Continued)

OTHER PUBLICATIONS

Supplementary European Search Report for corresponding European Patent Application No. 08738964.9, mailed on Aug. 10, 2010.

*Primary Examiner* — Kenneth Bomberg
*Assistant Examiner* — Jason Sheppard
(74) *Attorney, Agent, or Firm* — Oliff & Berridge, PLC

(57) ABSTRACT

In an internal combustion engine, an $NO_X$ selective reducing catalyst is arranged in an engine exhaust passage. Urea is fed in the $NO_X$ selective reducing catalyst, ammonia generated from this urea is adsorbed at the $NO_X$ selective reducing catalyst, and the $NO_X$ contained in the exhaust gas is selectively reduced mainly by the adsorbed ammonia. An $NO_X$ sensor able to detect $NO_X$ and ammonia contained in the exhaust gas is arranged in the engine exhaust passage downstream of the $NO_X$ selective reducing catalyst. It is judged that the amount of adsorption of ammonia at the $NO_X$ selective reducing catalyst is saturated based on the detection value of the $NO_X$ sensor when the feed of fuel to the engine is stopped during the deceleration operation.

3 Claims, 6 Drawing Sheets

U.S. PATENT DOCUMENTS

| | | | |
|---|---|---|---|
| 8,056,404 B2 * | 11/2011 | Murase | 73/114.69 |
| 8,256,205 B2 * | 9/2012 | Weber | 60/276 |
| 2003/0051468 A1 * | 3/2003 | Van Nieuwstadt et al. | 60/286 |
| 2004/0098978 A1 | 5/2004 | Tarabulski et al. | |
| 2005/0034450 A1 | 2/2005 | Itoh et al. | |
| 2005/0217249 A1 | 10/2005 | Itoh et al. | |
| 2006/0010857 A1 | 1/2006 | Hu et al. | |
| 2007/0204600 A1 * | 9/2007 | Kubinski et al. | 60/286 |
| 2009/0199541 A1 * | 8/2009 | Walz et al. | 60/276 |
| 2009/0199542 A1 * | 8/2009 | Walz et al. | 60/276 |

FOREIGN PATENT DOCUMENTS

| | | | |
|---|---|---|---|
| JP | A-10-33948 | | 2/1998 |
| JP | A-2001-27113 | | 1/2001 |
| JP | A-2003-293743 | | 10/2003 |
| JP | A-2003-314256 | | 11/2003 |
| JP | A-2005-127256 | | 5/2005 |
| WO | WO2007/028677 | * | 3/2007 |

* cited by examiner

Fig.1
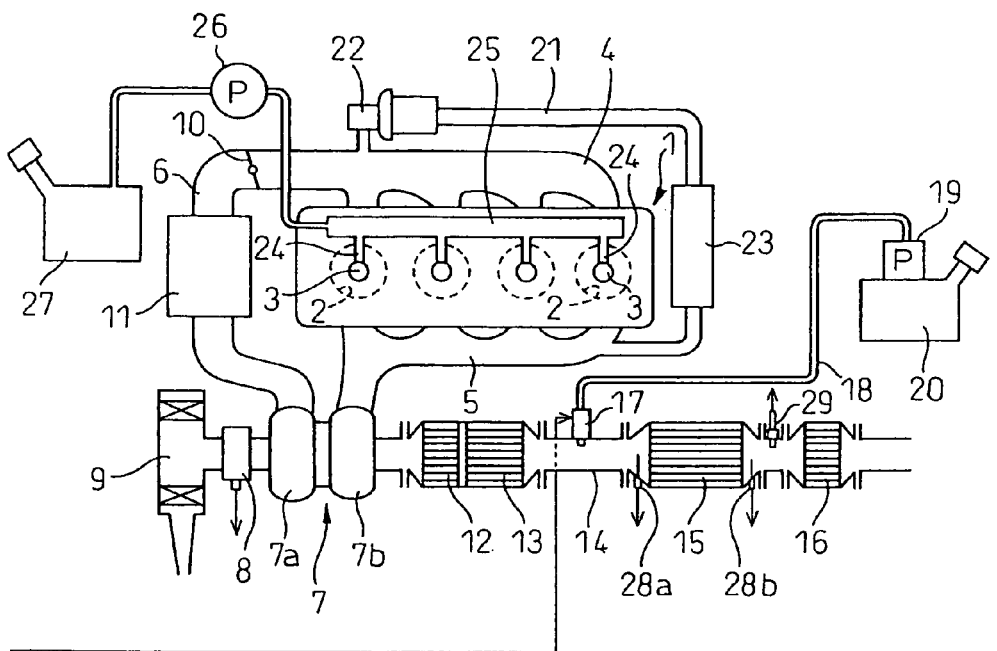
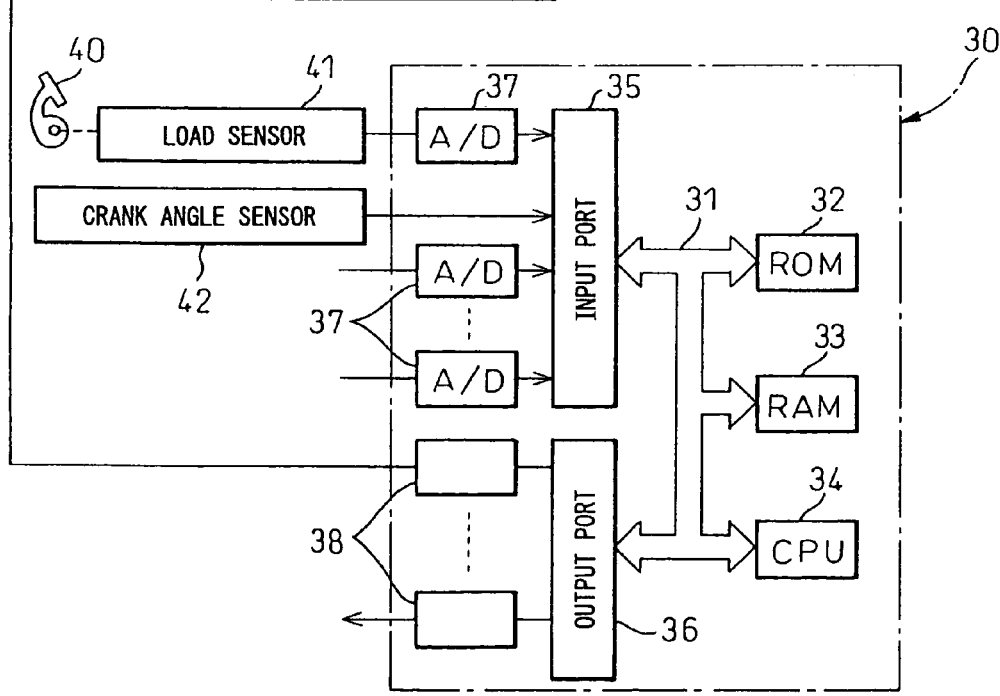

Fig. 4
(A)
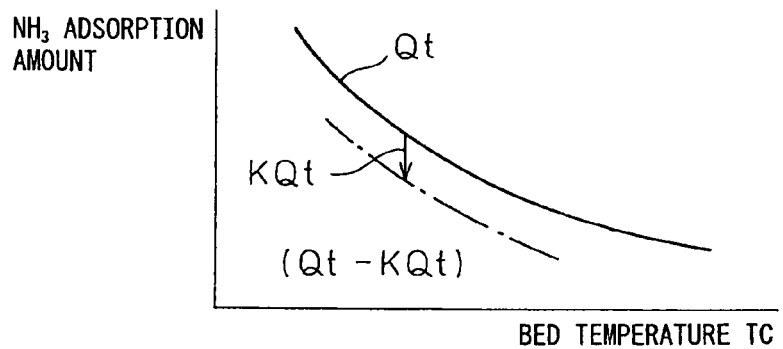
(B)
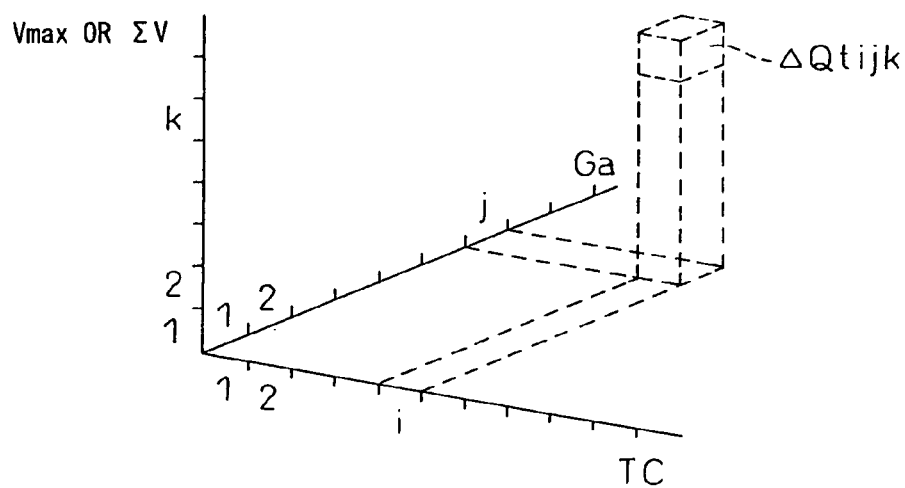
(C)
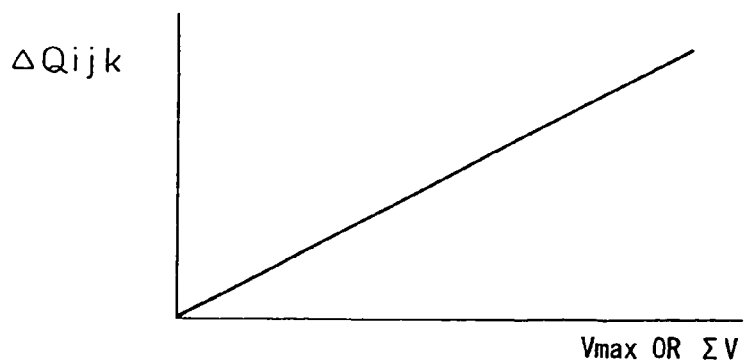

Fig.7
(A)
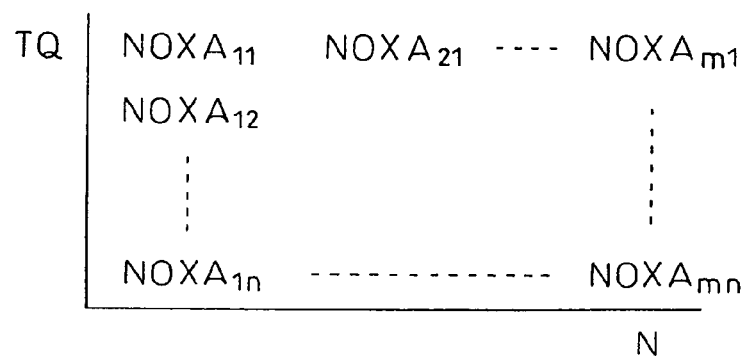
(B)
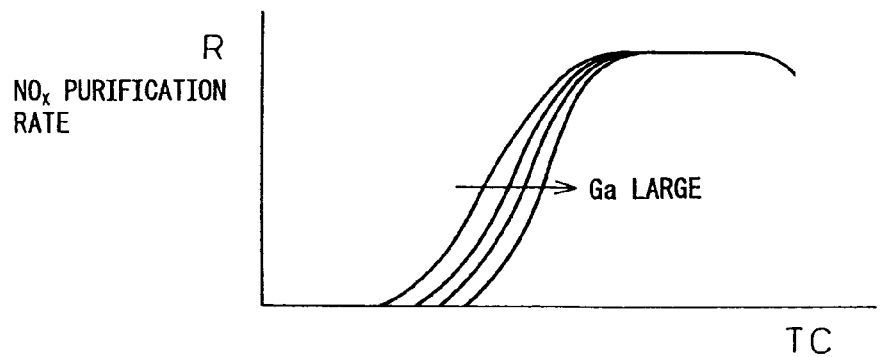
(C)
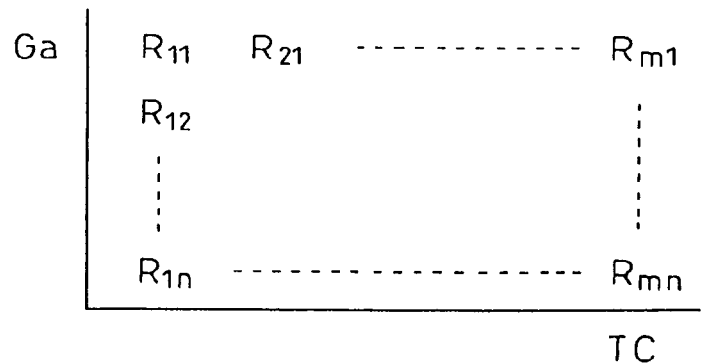

EXHAUST PURIFICATION DEVICE OF AN INTERNAL COMBUSTION ENGINE

TECHNICAL FIELD

The present invention relates to an exhaust purification device of an internal combustion engine.

BACKGROUND ART

Known in the art is an internal combustion engine arranging an $NO_X$ selective reducing catalyst in an engine exhaust passage, feeding urea to the $NO_X$ selective reducing catalyst to make ammonia generated from this urea be adsorbed at the $NO_X$ selective reducing catalyst, and mainly using this adsorbed ammonia to selectively reduce the $NO_X$ contained in the exhaust gas (see for example Japanese Patent Publication (A) No. 2005-127256). In this regard, when using the ammonia adsorbed at the $NO_X$ selective reducing catalyst to selectively reduce the $NO_X$ contained in the exhaust gas, the maximum $NO_X$ purification rate can be obtained if making the amount of ammonia adsorbed at the $NO_X$ selective reducing catalyst the saturated state.

Therefore, in the above-mentioned internal combustion engine, the practice has been to arrange $NO_X$ sensors at the upstream side and the downstream side of the $NO_X$ selective reducing catalyst and find the $NO_X$ purification rate at the $NO_X$ selective reducing catalyst from the detection values of these $NO_X$ sensors, calculate the amount of adsorbed ammonia consumed for reducing $NO_X$ in the $NO_X$ selective reducing catalyst from the $NO_X$ purification rate and the amount of $NO_X$ exhausted from the engine, calculate the amount of adsorbed ammonia adsorbed at the $NO_X$ selective catalyst from the amount of consumption of the adsorbed ammonia and the amount of urea fed, and control the feed of the urea so that this amount of adsorbed ammonia becomes the saturated state.

However, the $NO_X$ sensors not only detect the $NO_X$ contained in the exhaust gas, but also detect the ammonia contained in the exhaust gas. Accordingly, it is unknown whether the output values of the $NO_X$ sensors are showing the amount of $NO_X$ contained in the exhaust gas or the amount of ammonia. Accordingly, there is a problem in that the amount of adsorbed ammonia cannot be accurately controlled to the target amount if controlling the amount of feed of urea based on the output value of the $NO_X$ sensor.

DISCLOSURE OF THE INVENTION

An object of the present invention is to provide an exhaust purification device of an internal combustion engine able to accurately judge whether an amount of adsorption of ammonia at an $NO_X$ selective reducing catalyst is saturated.

According to the present invention, there is provided an exhaust purification device of an internal combustion engine, arranging an $NO_X$ selective reducing catalyst in an engine exhaust passage, feeding urea to the $NO_X$ selective reducing catalyst to make an ammonia generated from the urea be adsorbed at the $NO_X$ selective reducing catalyst, and mainly using an adsorbed ammonia to selectively reduce $NO_X$ contained in an exhaust gas, wherein an $NO_X$ sensor capable of detecting $NO_X$ and ammonia contained in the exhaust gas is arranged in the engine exhaust passage downstream of the $NO_X$ selective reducing catalyst and it is judged if an amount of adsorption of ammonia at the $NO_X$ selective reducing catalyst is saturated or not based on a detection value of the $NO_X$ sensor when a feed of fuel to the engine is stopped during deceleration operation.

In the present invention, the amount of adsorption of ammonia at the $NO_X$ selective reducing catalyst is judged to be saturated or not based on the detection value of the $NO_X$ sensor when the feed of fuel to the engine is stopped during deceleration operation, that is, when $NO_X$ is not contained in the exhaust gas, therefore is possible to accurately judge whether the amount of adsorption of ammonia at the $NO_X$ selective reducing catalyst is saturated or not.

BRIEF DESCRIPTION OF THE DRAWINGS

FIG. 1 is an overview of a compression ignition type internal combustion engine, FIG. 4 is a view showing a target ammonia adsorption amount Qt and correction amount $\Delta Qtijk$, KQT, etc. of the same, FIG. 7 is a view showing a map of an exhaust $NO_X$ amount NOXA etc.

BEST MODE FOR CARRYING OUT THE INVENTION

Figure 2:
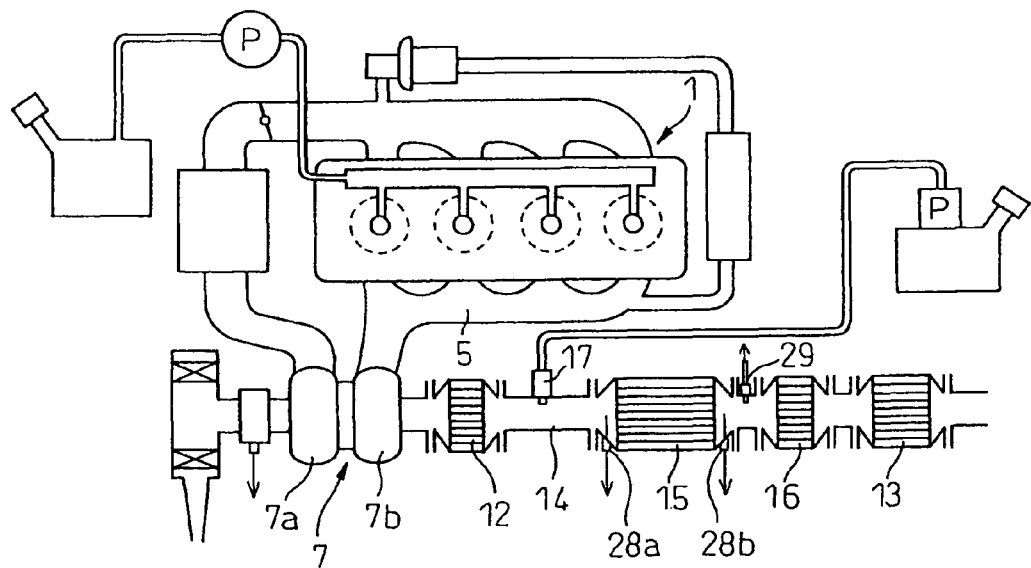
FIG. 2 is an overview showing another embodiment of a compression ignition type internal combustion engine.

FIG. 1 shows an overview of a compression ignition type internal combustion engine.

Referring to FIG. 1, 1 indicates an engine body, 2 a combustion chamber of a cylinder, 3 an electronic control type fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7, while the inlet of the compressor 7a is connected through an intake air detector 8 to an air cleaner 9. Inside the intake duct 6, a throttle valve 10 driven by a step motor is arranged. Further, around the intake duct 6, a cooling device 11 for cooling the intake air flowing through the inside of the intake duct 6 is arranged. In the embodiment shown in FIG. 1, the engine cooling water is guided to the cooling device 11 where the engine cooling water cools the intake air.

On the other hand, the exhaust manifold 5 is connected to the inlet of an exhaust turbine 7b of the exhaust turbocharger 7, while the outlet of the exhaust turbine 7b is connected to the inlet of an oxidation catalyst 12. Downstream of the oxidation catalyst 12, a particulate filter 13 is arranged adjacent to the oxidation catalyst 12 for collecting particulate matter contained in the exhaust gas, while the outlet of this particulate filter 13 is connected through an exhaust pipe 14 to the inlet of an $NO_X$ selective reducing catalyst 15. The outlet of this $NO_X$ selective reducing catalyst 15 is connected to an oxidation catalyst 16.

Inside an exhaust pipe 14 upstream of the $NO_X$ selective reducing catalyst 15, an aqueous urea solution feed valve 17 is arranged. This aqueous urea solution feed valve 17 is connected through a feed pipe 18 and a feed pump 19 to an aqueous urea solution tank 20. The aqueous urea solution stored inside the aqueous urea solution tank 20 is injected by the feed pump 19 into the exhaust gas flowing within the exhaust pipe 14 from the aqueous urea solution feed valve 17, while the ammonia $((NH_2)_2CO+H_2O \rightarrow 2NH_3+CO_2)$ generated from urea causes the $NO_X$ contained in the exhaust gas to be reduced in the $NO_X$ selective reducing catalyst 15.

The exhaust manifold 5 and the intake manifold 4 are connected to each other through an exhaust gas recirculation (hereinafter referred to as the "EGR") passage 21. Inside the EGR passage 21 is arranged an electronic control type EGR control valve 22. Further, around the EGR passage 21 is arranged a cooling device 23 for cooling the EGR gas flowing through the inside of the EGR passage 21. In the embodiment shown in FIG. 1, the engine cooling water is guided through the cooling device 23, where the engine cooling water is used to cool the EGR gas. On the other hand, each fuel injector 3 is connected through a fuel feed pipe 24 to a common rail 25. This common rail 25 is connected through an electronically controlled variable discharge fuel pump 26 to a fuel tank 27. The fuel stored in the fuel tank 27 is fed by the fuel pump 26 into the common rail 25, and the fuel fed to the inside of the common rail 25 is fed through each fuel pipe 24 to the fuel injectors 3.

An electronic control unit 30 is comprised of a digital computer provided with a ROM (read only memory) 32, RAM (random access memory) 33, CPU (microprocessor) 34, input port 35, and output port 36 all connected to each other by a bi-directional bus 31. Temperature sensors 28a and 28b are arranged in the upstream side and downstream side of the $NO_X$ selective reducing catalyst 15, respectively. Further, an $NO_X$ sensor 29 is arranged at the downstream side of the $NO_X$ selective reducing catalyst 15. The output signals of these temperature sensors 28a and 28b, $NO_X$ sensor 29, and intake air detector 8 are input through corresponding AD converters 37 into the input port 35.

On the other hand, the accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crank shaft rotates by for example 15° connected to it. On the other hand, the output port 36 is connected through corresponding drive circuits 38 to the fuel injectors 3, throttle valve 10 drive step motor, aqueous urea solution feed valve 17, feed pump 19, EGR control valve 22, and fuel pump 26.

The oxidation catalyst 12 carries a precious metal catalyst such as for example platinum. This oxidation catalyst 12 performs an action of converting the NO contained in the exhaust gas to $NO_2$ and an action of oxidizing the HC contained in the exhaust gas. On the other hand, a particulate filter carrying a catalyst may be used as the particulate filter 13. For example, a particulate filer carrying a precious metal catalyst such as platinum may be used. Further, the $NO_X$ selective reducing catalyst 15 comprises an ammonia adsorption type of Fe zeolite having a high $NO_X$ purification rate at low temperatures. The oxidation catalyst 16, for example, carries a precious metal catalyst consisting of platinum. This oxidation catalyst 16 performs an action oxidizing ammonia leaked from the $NO_X$ selective reducing catalyst 15.

FIG. 2 shows another embodiment of a compression ignition type internal combustion engine. In this embodiment, the particulate filter 13 is arranged downstream of the oxidation catalyst 16. Accordingly, in this embodiment, the outlet of the oxidation catalyst 12 is connected through the exhaust pipe 14 to the inlet of the $NO_X$ selective reducing catalyst 15.

Figure 3:
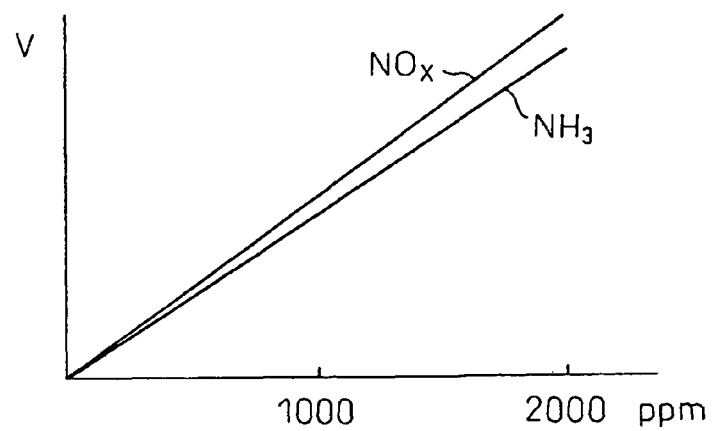
FIG. 3 is a view showing an output value of an $NO_X$ sensor.

Now, the $NO_X$ sensor 29 is originally for detecting the $NO_X$ in the exhaust gas. However, the ammonia $NH_3$ contained in the exhaust gas is also oxidized in the $NO_X$ sensor 29 to $NO_X$, therefore the $NO_X$ sensor 29 detects the $NO_X$ and ammonia contained in the exhaust gas. FIG. 3 shows the relationship between the output voltage V of the $NO_X$ sensor 29 and the $NO_X$ concentration and $NH_3$ concentration in the exhaust gas. It is clear from FIG. 3 that the output voltage V of the $NO_X$ sensor 29 is proportional to the $NO_X$ concentration and $NH_3$ concentration in the exhaust gas.

In FIG. 4(A), Qt shows the ammonia adsorption amount of the $NO_X$ selective reducing catalyst 15 when saturated, that is, the saturated adsorption amount. In this embodiment of the present invention, this ammonia saturated adsorption amount Qt is made the target ammonia adsorption amount. As shown in FIG. 4(A), this target ammonia adsorption amount Qt is a function of the bed temperature TC of the $NO_X$ selective reducing catalyst 15. The higher the bed temperature TC, the more the target ammonia adsorption amount Qt drops. In this embodiment of the present invention, in the initial period when the engine begins to be used, the feed of the urea is controlled so that the amount of adsorption of ammonia at the $NO_X$ selective reducing catalyst 15 becomes the target ammonia adsorption amount Qt.

In this regard, the saturated adsorption amount of ammonia is different for each $NO_X$ selective reducing catalyst 15. Further, the saturated adsorption amount of ammonia changes with the passage of the usage period. Accordingly, in the event that the target ammonia adsorption amount Qt exceeds the saturated adsorption amount of the ammonia, the large amount of ammonia that could not be completely adsorbed in this case is exhausted from the $NO_X$ selective reducing catalyst 15. In this case, to prevent ammonia being exhausted from the $NO_X$ selective reducing catalyst 15, it is necessary to reduce the target ammonia adsorption amount Qt. Therefore, in the present invention, the exhaust of the ammonia from the $NO_X$ selective reducing catalyst 15 is detected by the $NO_X$ sensor 29, and the target ammonia adsorption amount Qt is corrected to a declining direction in response to the detection value of this $NO_X$ sensor 29.

Figure 5:
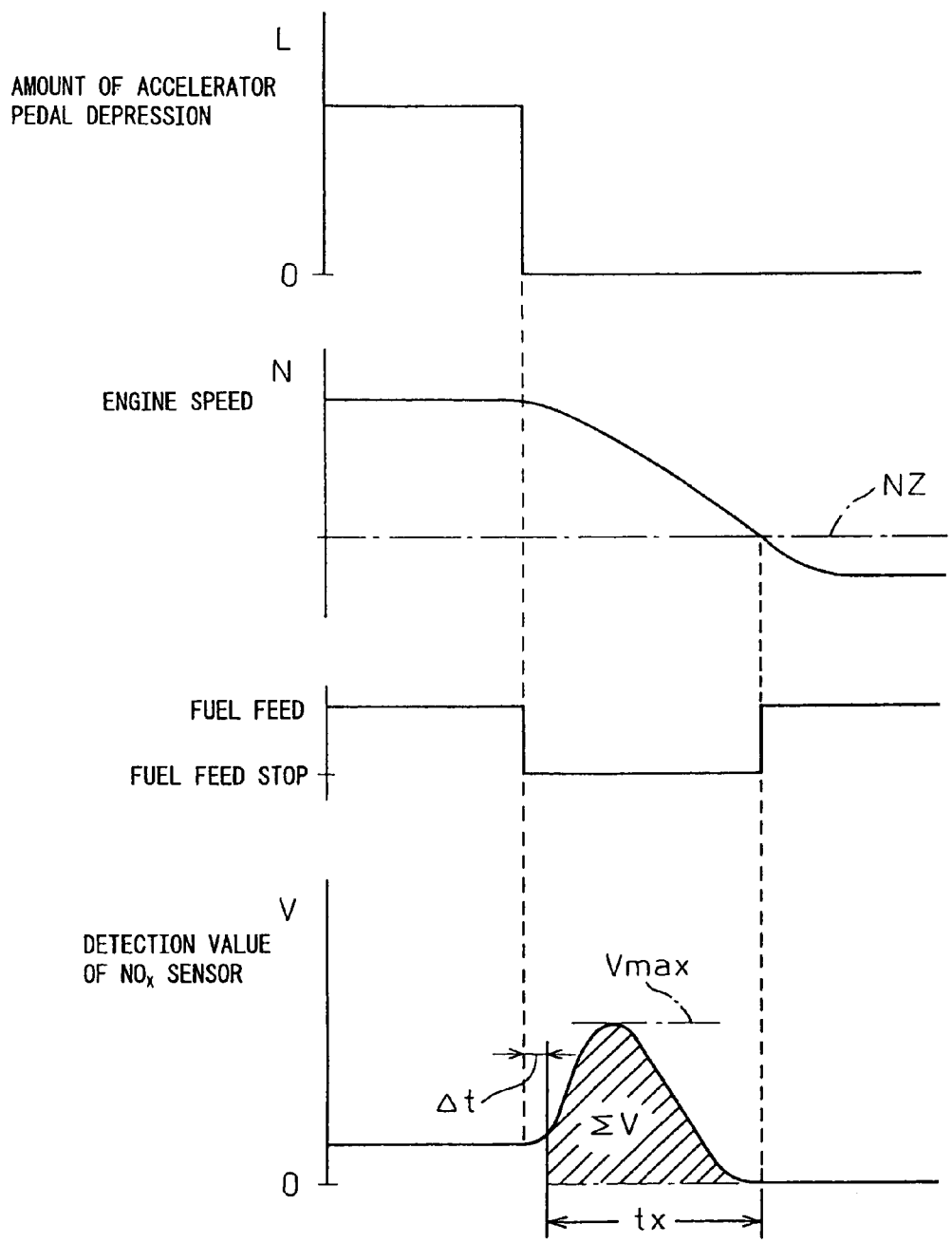
FIG. 5 is a time chart showing change of the output value of an $NO_X$ sensor.

Next, referring to FIG. 5, the detection method of the exhaust of the ammonia of the $NO_X$ sensor 29 will be explained. FIG. 5 shows when the feed of fuel to the engine during engine operation is stopped. That is, when the amount of depression L of the accelerator pedal 40 becomes zero and deceleration begins, the feed of fuel is stopped when the engine speed N is higher than the resume speed NZ, for example, 800 rpm. Then, if the engine speed N drops to the resume speed NZ, the feed of fuel is restarted.

Now, when the amount of adsorption of ammonia in the $NO_X$ selective reducing catalyst 15 exceeds the saturated adsorption amount, ammonia is exhausted from the $NO_X$ selective reducing catalyst 15 even when feed of fuel is stopped during the deceleration operation. On the other hand, when the feed of fuel is stopped, $NO_X$ is not exhausted from the engine. Accordingly, at this time, whether or not ammonia is being exhausted from the $NO_X$ selective reducing catalyst 15 can be detected by the $NO_X$ sensor 29. Therefore, in the present invention, it is judged if the amount of adsorption of ammonia in the $NO_X$ selective reducing catalyst 15 is saturated or not based on the detection value of the $NO_X$ sensor 29 when the feed of fuel to the engine is stopped during the deceleration operation.

In this regard, when the amount of adsorption of ammonia at the $NO_X$ selective reducing catalyst 15 exceeds the saturated adsorption amount, even before the deceleration operation begins, the ammonia is exhausted from the $NO_X$ selective reducing catalyst 15. However, at this time, the ammonia is used for reducing the $NO_X$ contained in the exhaust gas, so the amount of ammonia exhausted from the $NO_X$ selective reducing catalyst 15 becomes a small amount. Further, at the time, the amount of $NO_X$ exhausted from the $NO_X$ selective reducing catalyst 15 also becomes a small amount. Accordingly, as shown in FIG. 5, normally the output value V of the $NO_X$ sensor 29 before the beginning of the deceleration operation is low. When the deceleration operation is started and the feed of fuel is stopped, there is no longer any $NO_X$ that should be reduced, thereby the output value V of the $NO_X$ sensor 29 increases.

When the feed of fuel is stopped during the deceleration operation, the feed of urea is also stopped. Accordingly, at this time, the amount of ammonia exhausted from the $NO_X$ selective reducing catalyst 15 once rises, then decreases along with the decrease of the excess amount of adsorbed ammonia with respect to the saturated adsorption amount. At this time, it is believed that the excess amount of ammonia with respect to the saturated adsorption amount is proportional to the maximum Vmax of the detection value V of the $NO_X$ sensor 29 or is proportional to the integral value $\Sigma V$ of the detection value V of the $NO_X$ sensor 29. However, in this embodiment of the present invention, after the deceleration operation begins, the detection action by the $NO_X$ sensor 29 begins after a wait time $\Delta t$ until stabilization elapses. Accordingly, the maximum value Vmax is the maximum value of the detection value V of the $NO_X$ sensor 29 after the elapse of the wait time $\Delta t$, and the integral value $\Sigma V$ is, after the elapse of the wait time $\Delta t$, the cumulative value of the detection value V of the $NO_X$ sensor 29 up to the elapse of the tx time.

Now, in the present invention, when it is judged that the amount of adsorption of ammonia at the $NO_X$ selective reducing catalyst 15 is saturated based on the detection value of the $NO_X$ sensor 29, the target ammonia adsorption amount Qt is corrected to a declining direction. In this case, in the present invention, the relationship between the output value of the $NO_X$ sensor 29 and the correction amount $\Delta Qt$ of the target ammonia adsorption amount Qt is stored in advance. The correction amount $\Delta Qt$ of the target ammonia adsorption amount Qt is calculated from the output value of the $NO_X$ sensor 29 based on this relationship.

Specifically speaking, in the embodiment of the present invention, the correction value $\Delta Qtijk$ of the target ammonia adsorption amount Qt is stored as a function of the exhaust gas amount, that is, the intake air amount Ga, the bed temperature TC of the $NO_X$ selective reducing catalyst 15, and the maximum value Vmax or the integral value $\Sigma V$ of the output value V of the $NO_X$ sensor 29 in the form of a three-dimensional map in advance in the ROM 32 as shown in FIG. 4(B). In this case, as shown in FIG. 4(C), the correction value $\Delta Qtijk$ of the target ammonia adsorption amount Qt is directly proportional to the maximum value Vmax or the integral value $\Sigma V$.

When the correction amount $\Delta Qtijk$ of the target ammonia adsorption amount Qt is found, the target ammonia adsorption amount Qt is reduced by the correction amount $\Delta Qtijk$ and the result (Qt–$\Delta Qtijk$) is made the new target ammonia adsorption amount. The feed of urea is controlled so that the amount of adsorption of ammonia at the $NO_X$ selective reducing catalyst 15 becomes the new target ammonia adsorption amount (Qt–$\Delta Qtijk$). Next, in this state, when the ammonia is exhausted again from the $NO_X$ selective reducing catalyst 15 when the deceleration operation is performed, the correction amount $\Delta Qtijk$ is calculated again from the detection value V of the $NO_X$ sensor 29, and the correction amount is added to the correction amount used up to now to make it the new correction amount KQt.

When the new correction amount KQt is found, as shown in FIG. 4(A), the target ammonia adsorption amount Qt is reduced by the correction amount KQt and the result (Qt–KQt) is made the new target ammonia adsorption amount. The feed of urea is controlled so that the amount of adsorption of ammonia at the $NO_X$ selective reducing catalyst 15 becomes the new target ammonia adsorption amount (Qt–KQt). As clear from FIG. 4(B), the correction amount $\Delta Qtijk$, that is, KQt, changes in accordance with the intake air amount Ga and the bed temperature TC of the $NO_X$ selective reducing catalyst 15, therefore the new target ammonia adsorption amount (Qt–KQt) not only changes in accordance with the bed temperature TC of the $NO_X$ selective reducing catalyst 15, but also changes in accordance with the intake air amount Ga.

Figure 6:
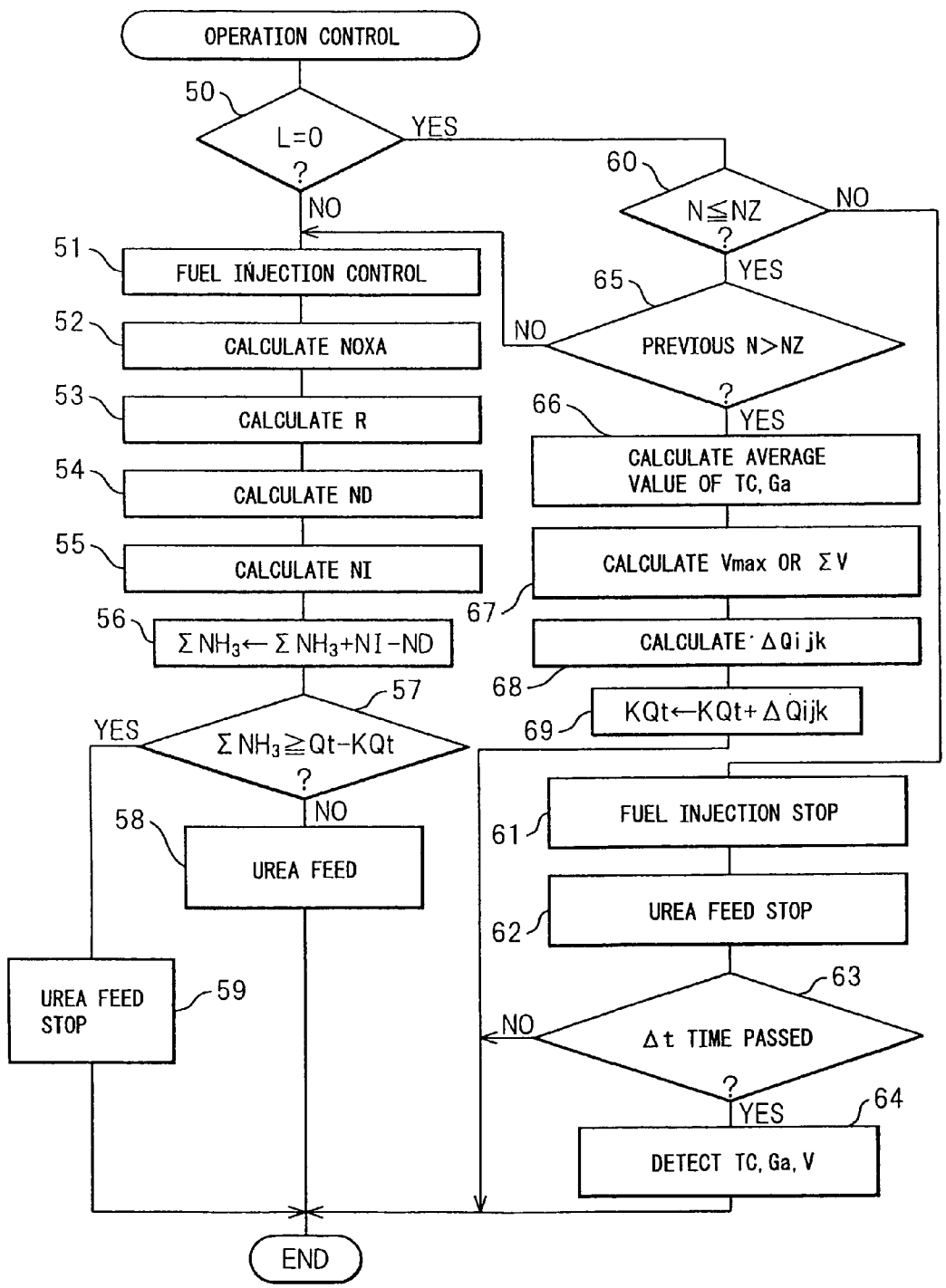
FIG. 6 is a flow chart for controlling engine operation.

FIG. 6 shows the routine for controlling the engine operation. Note that this routine is executed by interruption at regular intervals.

Referring to FIG. 6, first, at step 50, it is judged if the amount of depression L of the accelerator pedal 40 is zero. When the amount of depression L of the accelerator pedal 40 is not zero, the routine proceeds to step 51, where fuel injection control is performed. Next, at step 52, the exhaust $NO_X$ amount NOXA exhausted per unit time from the combustion chamber 2 is calculated. This exhaust $NO_X$ amount NOXA, as shown in FIG. 7(A), is stored as a function of the required torque TQ and engine speed N in the form of a map in advance in the ROM 32.

Next, at step 53, the $NO_X$ purification rate R in the $NO_X$ selective reducing catalyst 15 is calculated. This $NO_X$ purification rate R, as shown in FIG. 7(B), is a function of bed temperature TC of the $NO_X$ selective reducing catalyst 15. Further, it changes in accordance with the exhaust gas amount, that is, the intake air amount Ga. This $NO_X$ purification rate R, as shown in FIG. 7(C), is stored as a function of the intake air amount Ga and the bed temperature TC of the $NO_X$ selective reducing catalyst 15 in the form of a map in advance in the ROM 32.

Next, at step 54, the adsorption amount of ammonia ND consumed per unit time to reduce $NO_X$ is calculated from the exhaust $NO_X$ amount NOXA and the $NO_X$ purification rate R. Next, at step 55, the feed ammonia amount NI fed per unit time in the form of urea is calculated. Next, at step 56, the ammonia adsorption amount $\Sigma NH_3$ ($\Sigma NH_3$+NI–ND) of the $NO_X$ selective reducing catalyst 15 is calculated. Next, at step 57, it is judged if the ammonia adsorption amount $\Sigma NH_3$ is larger than the target ammonia adsorption amount (Qt–KQt). When $\Sigma NH_3$<(Qt–KQt), the routine proceeds to step 58, where urea is fed, and when $\Sigma NH_3 \geq$(Qt–KQt), the routine proceeds to step 59, where the feed of urea is stopped.

On the other hand, when the amount of depression L of the accelerator pedal 40 is zero at step 50, the routine proceeds to step 60, where it is judged if the engine speed N is lower than the resume speed NZ (FIG. 5). When N>NZ, the routine proceeds to step 61, where the feed of fuel is stopped, then at step 62, the feed of urea is stopped. Next, at step 63, it is judged if the wait time $\Delta t$ has elapsed. When the wait time $\Delta t$ has elapsed, the routine proceeds to step 64, where the bed temperature TC of the NOX selective reducing catalyst 15 is detected from the average value of the output value of a pair of temperature sensors 28a, 28b and, further, the intake air amount Ga and the output value V of the $NO_X$ sensor 29 are detected.

Next, at step 60, when it is judged that N$\leq$NZ, the routine proceeds to step 65, where it is judged if in the previous treatment cycle, N>NZ. When N>NZ, that is, when N>NZ becomes N$\leq$NZ, the routine proceeds to step 66, where the average values of the bed temperature TC and the intake air amount Ga within a time tx (FIG. 5) are calculated. Next, at step 67, the maximum value Vmax or the integral value ΣV of the output value V of the $NO_X$ sensor 29 is calculated.

Next, at step 68, the correction amount ΔQijk is calculated from the three-dimensional map shown in FIG. 4(B) based on the average value of these bed temperatures TC, the average value of the intake air amount Ga, and the maximum value Vmax or the integral value ΣV. Next, at step 69, the correction amount KQt(←KQt+ΔQijk) is updated. On the other hand, when it is judged that N>NZ is not the case at step 65, the routine proceeds to step 51, where the fuel injection is restarted.

LIST OF REFERENCE NUMERALS

4 . . . intake manifold
5 . . . exhaust manifold
7 . . . exhaust turbocharger
12, 16 . . . oxidation catalyst
13 . . . particulate filter
15 . . . $NO_X$ selective reducing catalyst
17 . . . aqueous urea solution feed valve
29 . . . $NO_X$ sensor

The invention claimed is:

1. An exhaust gas purification device for an internal combustion engine, the exhaust gas purification device comprising:
   an $NO_X$ selective reducing catalyst disposed in an exhaust passage of the internal combustion engine;
   a urea injector disposed in the exhaust passage upstream of the $NO_X$ selective reducing catalyst that feeds urea to the $NO_X$ selective reducing catalyst such that an ammonia generated from the urea is adsorbed by the $NO_X$ selective reducing catalyst, the adsorbed ammonia being used by the $NO_X$ selective reducing catalyst to selectively reduce $NO_X$ contained in an exhaust gas;
   an $NO_X$ sensor disposed in the exhaust passage downstream of the $NO_X$ selective reducing catalyst and that detects $NO_X$ and ammonia contained in the exhaust gas downstream of the $NO_X$ selective reducing catalyst; and
   an electronic control unit having control logic configured to:
   (i) judge whether or not a feed of fuel to the engine has been stopped during a deceleration operation, and
   (ii) judge whether or not an amount of adsorption of ammonia at the $NO_X$ selective reducing catalyst is saturated based on a detection value of the $NO_X$ sensor which is obtained: (a) when the electronic control unit has judged that the feed of fuel to the engine has been stopped and while the feed of the fuel to the engine remains stopped during the deceleration operation, (b) while no $NO_X$ is produced by the internal combustion engine, and (c) while feeding of the urea by the urea injector is stopped.

2. The exhaust gas purification device as claimed in claim 1, wherein the electronic control unit controls a feed amount of urea fed by the urea injector so that the amount of adsorption of ammonia at the $NO_X$ selective reducing catalyst becomes a target ammonia adsorption amount, the electronic control unit decreasing the target adsorption amount when it is determined, based on the detection value of the $NO_X$ sensor, that the amount of adsorption of ammonia at the $NO_X$ selective reducing catalyst is saturated.

3. The exhaust gas purification device as claimed in claim 2, further comprising a memory that stores a relationship between an output value of the $NO_X$ sensor and a correction amount of the target ammonia adsorption amount, and wherein the electronic control unit determines the correction amount of the target ammonia adsorption amount from the output value of the $NO_X$ sensor based on the stored relationship.

\* \* \* \* \*